Patented Mar. 27, 1934

1,952,844

UNITED STATES PATENT OFFICE 1,952,844

MANUFACTURE OF ALIPHATIC ANHYDRIDES

Henry Dreyfus, London, England

No Drawing. Application June 24, 1930, Serial No. 463,578. In Great Britain July 22, 1929

13 Claims. (Cl. 260—123)

This invention relates to the manufacture of aliphatic anhydrides by the thermal decomposition of vapors of aliphatic acids.

I have now found that the oxides and acids of arsenic and antimony and the salts of such acids are highly useful catalysts for the reaction.

According to the invention I produce aliphatic anhydrides (and especially acetic anhydride) by subjecting the vapor of an aliphatic acid (and especially acetic acid vapor) to thermal decomposition in presence of a catalyst composed of or containing one or more oxides or acids of arsenic or antimony or salts of such acids.

As instances of such compounds of arsenic or antimony that have been found especially useful for the purposes of the invention, I may mention arsenic trioxide, arsenic pentoxide, antimony trioxide ($Sb_4O_6$), antimony pentoxide, and salts of arsenic or antimonic acid such for instance as sodium arsenate, potassium arsenate, calcium arsenate, sodium antimonate, potassium antimonate, or other alkali or alkali earth metal salts or other salts of arsenic or antimonic acids.

The thermal decomposition may be performed at temperatures between about 300° and 1000° C., temperatures between about 350° and 700° C. being especially suitable.

The thermal decomposition may be performed in any convenient way, as for instance by passing the aliphatic acid vapor in presence of the catalyst, in a stream through fireclay, silica, copper or other tubes or other forms of apparatus heated to the desired temperature. In cases where the catalyst is relatively or substantially non-volatile under the conditions of reaction it may conveniently be employed in the solid or liquid state; if desired, it may be coated upon or mixed with a solid filling material or carrier such for instance as pumice, kieselguhr, "carborundum" or the like. For instance the reaction may conveniently be performed by passing acetic acid vapor or other aliphatic acid vapor (which may if desired be preheated in absence of the catalyst to any suitable temperature, e. g. to the temperature obtaining in the reaction zone) in a rapid stream through a tube or other form of reaction zone heated to the desired temperature and filled with balls or stones of pumice, kieselguhr or the like coated or mixed with a catalyst which is non-volatile or substantially non-volatile under the conditions of the reaction, for instance a catalyst composed of or comprising one or more non-volatile salts of arsenic or antimonic acid such for instance as:—sodium arsenate, potassium arsenate, calcium arsenate, magnesium arsenate, sodium antimonate, potassium antimonate or mixtures of any of such salts.

In cases where the catalyst is substantially volatile under the conditions of reaction the thermal decomposition may conveniently be performed by passing a mixture of the aliphatic acid vapor and the vapor of the catalyst in a stream through tubes or other form of reaction zones, heated to the desired temperature, and such reaction zones may, if desired, be filled or provided with a non-volatile catalyst such as above referred to, or, if desired, filled or provided with filling materials (e. g. pumice, kieselguhr, or the like). For instance, I may pass through such heated tubes or reaction zone a mixture of acetic (or other aliphatic) acid vapor and the vapor of arsenic trioxide or other volatile catalyst of the character referred to. When employing mixtures of aliphatic acid vapors and vapors of the catalysts I preferably employ mixtures containing at least 1% and especially at least 5% of the catalyst.

According to a further form of execution of the invention I may, especially when employing a catalyst which is volatile under the conditions of reaction, inject into a reaction vessel or zone heated to the desired temperature a mixture of the liquid aliphatic acid and the catalyst. For instance I may inject or introduce a mixture of liquid acetic (or other aliphatic) acid and arsenic trioxide, arsenic pentoxide, or arsenic acid. In such a form of execution of the invention I prefer to use mixtures of liquid aliphatic acids and catalysts containing between about 1% and 10%, and especially between 5% and 10% of the catalyst. Further, in such form of the invention, the reaction vessels may, if desired, be filled or provided with contact or filling materials and/or with non-volatile catalysts of the character referred to. The process of the invention may be performed under ordinary atmospheric pressure or under increased pressure (e. g. 1 to 5 atmospheres or more) or under reduced pressure or vacuum.

It will of course be understood that the thermal decomposition may, if desired, be performed in presence both of the catalysts of the character referred to and of catalysts hitherto known to promote the scission of aliphatic acids into their anhydrides, quite irrespective of the actual mode of operation employed for the thermal decomposition and irrespective of whether the catalysts of the invention or such further catalysts are employed in volatile or non-volatile form.

The anhydride produced by the process may be separated from the reaction vapors in any suitable way. Preferably however, the anhydride is not recovered by simple condensation of the vapors with subsequent treatment of the condensate, as such method of separation is very liable to cause considerable loss of anhydride through hydrolysis by the water present. To avoid such loss as far as possible the vapors are preferably subjected to treatment to separate the anhydride from the water vapor present or formed in the reaction. For instance, the gases or vapors from the reaction zone may be subjected to fractional condensation for example by leading them up through one or more fractionating columns maintained at a temperature or temperatures intermediate between the boiling points (under the conditions of pressure obtaining) of the anhydride and of water, whereby the anhydride is condensed and the water passes on in vapor form.

Or, for instance, the reaction gases or vapors may be passed through one or more solvents for the anhydride which are insoluble in water and which have higher boiling points than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapor form. As examples of such solvents may be mentioned chlorbenzene, paradichlorbenzene, benzylether, tetrachlorethane, paraffin oil, triacetin, phenetol, anisol, one or more cresols, and paracresyl acetate.

Or, for instance, the reaction gases or vapors may be subjected to condensation by the process described in U. S. application S. No. 284,566 filed 11th June, 1928, that is to say the anhydride may be condensed from the reaction vapors whilst carrying away the water vapor by the vapor of one or more "entraining liquids". In such form of execution the reaction vapors are preferably mixed after leaving the reaction zone with the vapors of the entraining liquid or liquids at a temperature below the boiling point (under the conditions of pressure obtaining) of the anhydride. Conveniently such mixing may be performed by introducing the reaction vapors (which should not be allowed to cool below the boiling point of water before becoming mixed with the vapors of the entraining liquid or liquids) into a vessel up which the vapors of the entraining liquid or liquids are caused to rise; by this means the anhydride may be substantially condensed and the water vapor carried away with the vapors of the entraining liquid or liquids. Examples of entraining liquids which I may use for such method of condensation are, as indicated in the said U. S. application S. No. 284,566, benzene, carbon tetrachloride, petrol, mixtures of two or more such bodies, or mixtures of ether with petroleum ether; it will be understood however that any other liquids chemically inert to the anhydride and having a high entraining capacity for water may be employed. The liquids should preferably have a low entraining capacity for the anhydride. Toluol, xylenes or other "entraining liquids" whose boiling points are intermediate between those of water and of the anhydride are especially suitable for this method of separation.

Or again, for instance, the reaction gases or vapors may be subjected to condensation by the process described in U. S. application S. No. 285,613 filed 15th June, 1928, that is to say they may be subjected to condensation by leading them under the surface of an "extracting liquid" cooled down or otherwise kept at temperatures below (and preferably considerably below) the boiling point of water. By the term "extracting" liquid is meant a liquid or liquid mixture in which the anhydride is soluble and which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. It is preferable to use as "extracting" liquids, liquids of the character referred to which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or again, for instance, the reaction vapors may be treated by the process described in my U. S. application S. No. 242,977 filed 27th December, 1927, that is to say they may be passed over or otherwise in contact with one or more "water binding" substances maintained at a temperature or temperatures below (and preferably substantially below) the temperature at which the reaction vapors are produced. By such treatment the water vapor may be substantially absorbed from the reaction vapors. In such treatment the water binding substances are preferably maintained at temperatures above the boiling point (under the conditions of pressure obtaining) of water to avoid condensation of water and resulting risk of loss of anhydride through hydrolysis, and for the best functioning of the treatment the water binding substances should be employed at temperatures above the boiling point of the anhydride in which case the water can be substantially absorbed and the anhydride pass on in vapor form. The term "water binding" substances means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

Or again, for instance, the reaction vapors may be subjected to condensation by the process described in U. S. application S. No. 330,577 filed 5th January, 1929, that is to say they may be caused to impinge upon a flowing stream of benzene (or other water insoluble solvent for the anhydride) whereby the gases or vapors are quickly cooled and condensed and the anhydride separated from the water. The benzene (or other solvent) so employed may be collected and the water layer (usually the lower layer) which separates out may be removed and the benzene (or equivalent) layer distilled to recover the anhydride.

In cases where the thermal decomposition of the aliphatic acid vapor is performed under pressures higher than atmospheric, it is preferable, prior to subjecting the reaction vapors to treatment for the recovery or separation of the anhydride, to pass the reaction vapors through one or more reducing valves in order to reduce the pressure substantially to atmospheric.

It is to be understood that the invention is not limited as to the strength of the aliphatic acid employed. The process can be performed even with the vapors of dilute acids; and besides affording a ready means for the manufacture of anhydrides from concentrated or highly concentrated acids, it affords valuable means for producing anhydrides from waste or dilute acids, and especially waste or dilute acids such as result from the acetylation of cellulose or other industrial acetylation processes.

The following example serves to illustrate a convenient form of execution of the invention, it being understood that it is given solely by way of illustration and is in no way limitative.

Example

Acetic acid vapor is passed in a rapid stream through a tube (e. g. of copper or fireclay) containing sodium antimonate spread or coated upon balls or stones of pumice or kieselguhr and heated to a temperature between 550° and 650° C.

The reaction gases or vapors are subjected to any of the methods hereinbefore referred to in order to separate the anhydride from the water vapor present or produced in the reaction.

The term "oxygen-containing compound of a metalloid of the fifth group of the periodic system" as used hereinafter in the claims is to be construed to mean oxides or acids of arsenic or antimony or salts of such acids.

What I claim and desire to secure by Letters Patent is:—

1. Process for the manufacture of an aliphatic anhydride which comprises thermally decomposing the vapor of an aliphatic acid in the presence of at least one oxygen-containing compound of a metalloid of the fifth group of the periodic system.

2. Process for the manufacture of an aliphatic anhydride which comprises thermally decomposing the vapor of an aliphatic acid in the presence of at least one oxide of a metalloid of the fifth group of the periodic system.

3. Process for the manufacture of an aliphatic anhydride which comprises thermally decomposing the vapor of an aliphatic acid in the presence of at least one oxy-acid of a metalloid of the fifth group of the periodic system.

4. Process for the manufacture of an aliphatic anhydride which comprises thermally decomposing the vapor of an aliphatic acid in the presence of at least one salt of an oxy-acid of a metalloid of the fifth group of the periodic system in which the metallic radicle is a metal at least as electropositive as magnesium.

5. Process for the manufacture of an aliphatic anhydride which comprises thermally decomposing the vapor of an aliphatic acid at a temperature of between 350° to 700° C. in the presence of at least one oxygen-containing compound of a metalloid of the fifth group of the periodic system.

6. Process for the manufacture of an aliphatic anhydride which comprises thermally decomposing the vapor of an aliphatic acid at a temperature of between 350° to 700° C. in the presence of at least one oxide of a metalloid of the fifth group of the periodic system.

7. Process for the manufacture of an aliphatic anhydride which comprises thermally decomposing the vapor of an aliphatic acid at a temperature of between 350° to 700° C. in the presence of at least one oxy-acid of a metalloid of the fifth group of the periodic system.

8. Process for the manufacture of an aliphatic anhydride which comprises thermally decomposing the vapor of an aliphatic acid at a temperature of between 350 to 700° C. in the presence of at least one salt of an oxy-acid of a metalloid of the fifth group of the periodic system in which the metallic radicle is a metal at least as electropositive as magnesium.

9. Process for the manufacture of an aliphatic anhydride which comprises thermally decomposing the vapor of an aliphatic acid in the presence of at least one oxygen-containing compound of a metalloid of the fifth group of the periodic system, the said catalyst being supported upon a solid filling material.

10. Process for the manufacture of acetic anhydride which comprises thermally decomposing the vapor of acetic acid in the presence of at least one oxygen-containing compound of a metalloid of the fifth group of the periodic system.

11. Process for the manufacture of acetic anhydride which comprises thermally decomposing the vapor of acetic acid at a temperature of between 350 to 700° C. in the presence of at least one oxide of a metalloid of the fifth group of the periodic system.

12. Process for the manufacture of acetic anhydride which comprises thermally decomposing the vapor of acetic acid at a temperature of between 350 to 700° C. in the presence of at least one oxy-acid of a metalloid of the fifth group of the periodic system.

13. Process for the manufacture of acetic anhydride which comprises thermally decomposing the vapor of acetic acid at a temperature of between 350 to 700° C. in the presence of at least one salt of an oxy-acid of a metalloid of the fifth group of the periodic system in which the metallic radicle is a metal at least as electropositive as magnesium.

HENRY DREYFUS.